US006646675B1

(12) United States Patent
Tang et al.

(10) Patent No.: US 6,646,675 B1
(45) Date of Patent: Nov. 11, 2003

(54) ADDRESSABLE SECURITY MONITORING SYSTEM

(75) Inventors: Alex Tang, Hsinchu (TW); Kuo-Tsai Yen, Hsinchuang (TW); Chung-Chien Lu, Hsinchu (TW); Chien-Hung Hsu, Tu-Cheng (TW)

(73) Assignee: United Microelectronics Cor., Hsinchu (TW)

( * ) Notice: Subject to any disclaimer, the term of this patent is extended or adjusted under 35 U.S.C. 154(b) by 0 days.

(21) Appl. No.: 09/073,577

(22) Filed: May 6, 1998

(30) Foreign Application Priority Data

Mar. 20, 1998 (TW) ....................................... 87104157 A

(51) Int. Cl.$^{7}$ ............................ H04N 7/18; G06K 9/00; G08B 29/00

(52) U.S. Cl. ....................... 348/143; 348/159; 382/103; 340/506

(58) Field of Search ................................ 348/143, 139, 348/142, 144, 150, 213, 151, 152, 153, 159, 154, 155, 169; 382/103; 340/541, 506, 534, 531

(56) References Cited

U.S. PATENT DOCUMENTS

| | | | | | |
|---|---|---|---|---|---|
| 4,511,886 | A | * | 4/1985 | Rodriguez | 348/143 |
| 4,700,230 | A | * | 10/1987 | Pshtissky et al. | 348/159 |
| 4,989,085 | A | * | 1/1991 | Elberbaum | 348/159 |
| 4,994,916 | A | * | 2/1991 | Pshtissky et al. | 348/159 |
| 5,164,827 | A | * | 11/1992 | Paff | 349/143 |
| 5,517,236 | A | * | 5/1996 | Seargent et al. | 348/159 |
| 5,526,133 | A | * | 6/1996 | Paff | 348/159 |
| 5,745,167 | A | * | 4/1998 | Kageyu et al. | 348/159 |
| 6,104,428 | A | * | 8/2000 | Lu et al. | 348/159 |

* cited by examiner

*Primary Examiner*—Gims S. Philippe
(74) *Attorney, Agent, or Firm*—J. C. Patents

(57) ABSTRACT

A security monitoring system with addressable capability is provided. This system allows a plurality of video cameras to be connected to the security guard room via a single cable instead of a plurality of dedicated cables, as in the prior art. The security monitoring system comprises the following: a cable; a central control unit connected at the first end of the cable, capable of issuing a first signal; at least one addressable video camera connected at the second end of the cable connected to the central control unit; and a monitoring device for displaying a second signal. The addressable video camera receives the first signal from the central control unit and compares the first signal with a preset value; if these match, the addressable video camera sends out a second signal via the cable back to the central control unit. This second signal is then displayed on the monitoring device coupled to the monitor. The signal transmission between the central control unit and the plurality of video cameras can be carried out over one single cable. The arrangement and handling of the security monitoring system is therefore considerably simplified.

14 Claims, 4 Drawing Sheets

ADDRESSABLE SECURITY MONITORING SYSTEM

CROSS-REFERENCE TO RELATED APPLICATION

This application claims the priority benefit of Taiwan application Ser. No. 87104157, filed Mar. 20, 1998, the full disclosure of which is incorporated herein by reference.

BACKGROUND OF THE INVENTION

1. Field of the Invention

This invention relates to security monitoring systems, and more particularly, to an addressable security monitoring system.

2. Description of Related Art

Security monitoring systems are customarily installed in places such as banks for the purpose of allowing the security guards to visually observe remote sites for criminal actions. Typically, a security monitoring system includes a number of video cameras that are connected via cables to a monitor installed in the security guard room. By conventional technology, each of the video cameras is connected via a dedicated cable to the security guard room. Therefore, if a great number of video cameras are installed, the total number of cables required to connect these video cameras to the security guard room is correspondingly large. The handling and arrangement of such a great number of cables is undoubtedly a laborious and troublesome task. A conventional security monitoring system is illustratively depicted in the following with reference to FIG. 1.

FIG. 1 is a schematic block diagram showing the configuration of a conventional security monitoring system. As shown, the security monitoring system includes a monitor 13, a switching circuit 11, and a plurality of video cameras connected respectively by a plurality of dedicated cables 15 to the switching circuit 11. In practical use, the switching circuit 11 and the monitor 13 are installed, for example, in a security guard room 14, while the video cameras 12 are installed at those places that are to be under surveillance. Each of the video cameras 12 is installed at a particular place for the purpose of allowing the security guard in the security guard room 14 to visually observe that place for possible criminal or unauthorized actions. The switching circuit 11 operates in a time-sharing multiplex manner that allows the video cameras 12 to be connected alternately to the monitor 13. The captured video images from these video cameras 12 can be either alternately displayed on the monitor 13, or simultaneously displayed together in partitioned blocks on the screen of the monitor 13. One drawback to this security monitoring system, however, is that, each of the video cameras 12 is connected by one dedicated cable to the security guard room 14. Each time one additional video camera is installed, it has to be connected by one additional cable to the security guard room 14. The total number of cables is therefore very large, which makes the handling and arrangement of the security monitoring system a very laborious and troublesome work. Moreover, in the event that the security guard room 14 is to be relocated to another site, the rearrangement of the cables would involve very laborious work.

SUMMARY OF THE INVENTION

It is therefore an objective of the present invention to provide a security monitoring system with addressable capability, which allows all of the video cameras in the system to be connected via only one single cable to the security guard room so as to allow a considerable simplification in the cabling of the security monitoring system and thus a considerable reduction in the installation cost.

In accordance with the foregoing and other objectives of the present invention, a security monitoring system with addressable capability is provided. The security monitoring system of the invention comprises the following: a cable having a first end and a second end; a central control unit connected at the first end of the cable, capable of issuing a first signal; at least one addressable video camera connected at the second end of the cable to be connected to the central control unit; and a monitoring device for displaying a second signal. The addressable video camera receives the first signal from the central control unit and compares the first signal with a preset value. If these match, the addressable video camera sends out a second signal via the cable back to the central control unit. The second signal is then displayed by the monitoring device.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
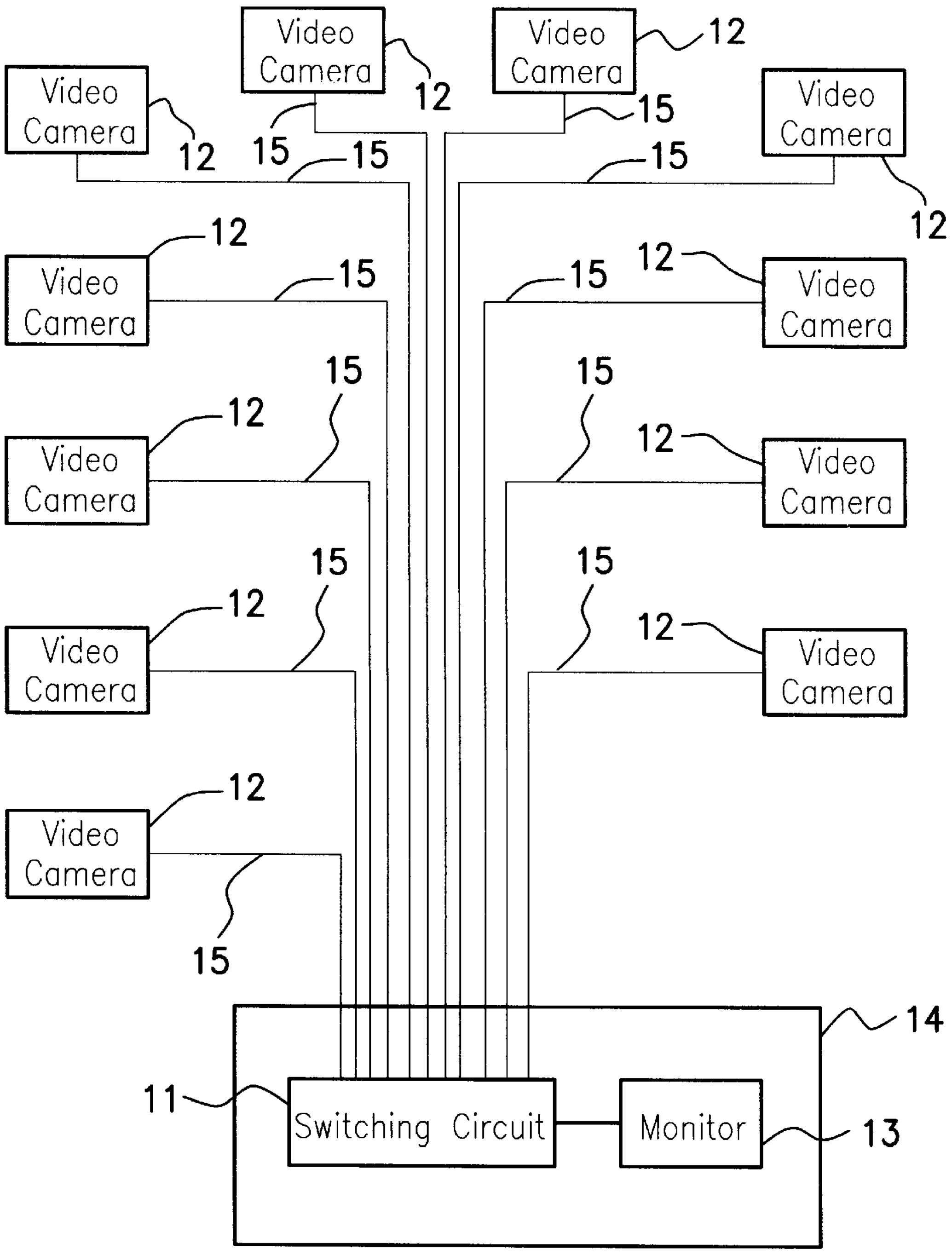
FIG. 1 (PRIOR ART)
FIG. 1 is a schematic block diagram of a conventional security monitoring system.
Figure 2:
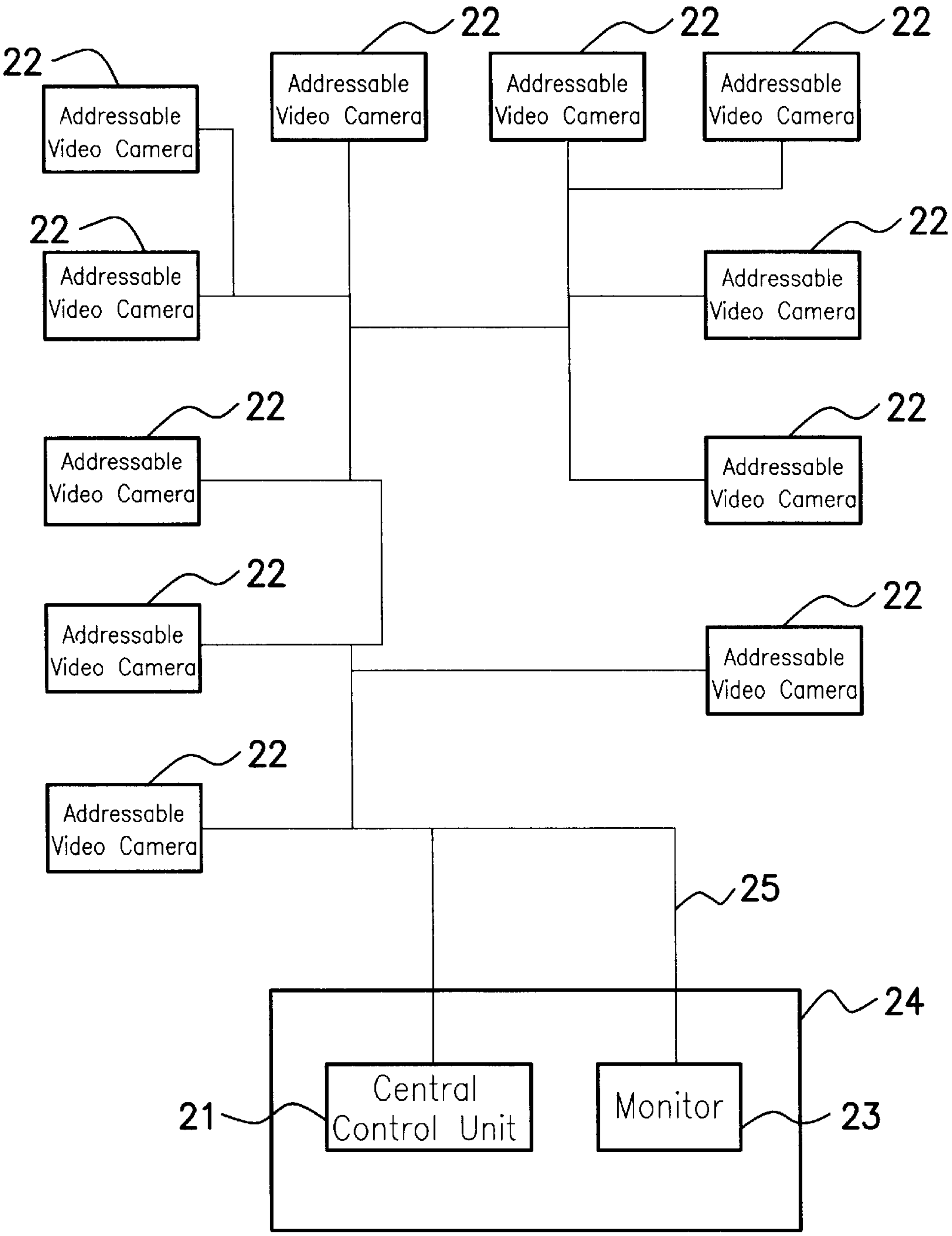
FIG. 2 is a schematic block diagram of the security monitoring system according to the invention.

FIG. 2 is a schematic block diagram of the security monitoring system according to the invention. As shown, the security monitoring system includes a central control unit 21, a monitor 23, and a plurality of addressable video cameras 22 which are connected via a single cable 25 to both the central control unit 21 and the monitor 23. In practical use, for example, the central control unit 21 and the monitor 23 are installed in a security guard room 24, while the addressable video cameras 22 are installed at those places that are to be under surveillance. Each of the addressable video cameras 22 is preset with a unique address value. In operation, when a particular one of the addressable video cameras 22 is to be switched into active operation, the central control unit 21 sends out and transfers the corresponding address signal via the cable 25 to all of the addressable video cameras 22. Each of the addressable video cameras 22 then compares the received address signal with its preset address value. The matched one of the addressable video cameras 22 is then switched into active operation, while the other unmatched ones still remain in idle state. The matched one of the addressable video cameras 22 then transmits the video signal of the captured video image via the cable 25 back to the central control unit 21 for display on the monitor 23.

Figure 3A:
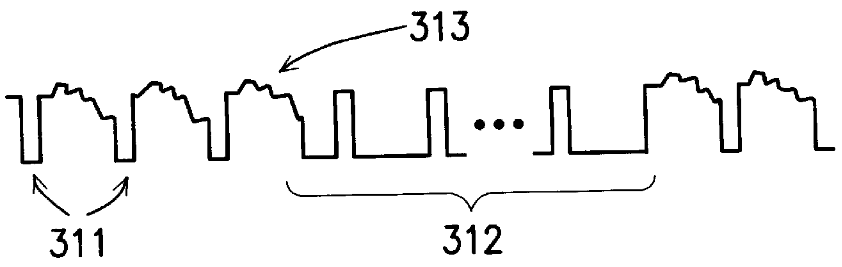
FIG. 3A is a waveform diagram showing the waveform format of a video control signal.

FIG. 3A is a waveform diagram showing the original waveform format of the video control signal when not imbedded with an address signal. As shown, the video control signal includes a horizontal sync component 311, a vertical sync component 312, and a scan signal 313.

Figure 3B:
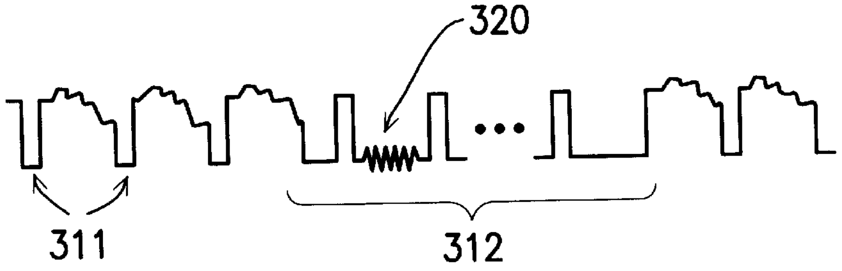
FIG. 3B is a waveform diagram showing the same of FIG. 3A except that it has an addressing signal imbedded in the vertical sync component of the video control signal.

Referring further to FIG. 3B, the address signal issued by the central control unit 21 is first modulated and then imbedded in the video control signal, as the part indicated by the reference numeral 320 in FIG. 3B. In the case of FIG. 3B, for example, the address signal 320 is imbedded in the vertical sync component 312 of the video control signal. The video control signal, along with the imbedded address signal, is then transferred over the cable 25 to all of the addressable video cameras 22. Each of the addressable video cameras 22 then demodulates the address signal 320 in the received video control signal and then compares the demodulated address data with the preset address value. The matched one of the addressable video cameras 22 is then switched into active operation.

Figure 4:
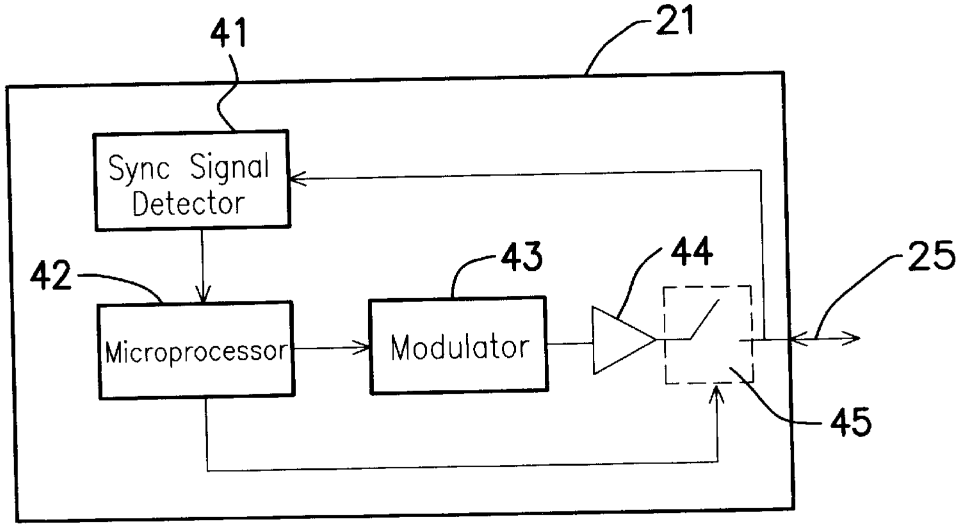
FIG. 4 is a schematic block diagram showing a detailed inside structure of the central control unit utilized in the security monitoring system of the invention.

FIG. 4 is a schematic block diagram showing the inside structure of the central control unit 21 utilized in the security monitoring system of the invention. As shown, the central control unit 21 includes a sync signal detector 41, a microprocessor 42, a modulator 43, an amplifier 44, and a switch 45 which is connected between the amplifier 44 and the cable 25 and whose ON/OFF state is controlled by the microprocessor 42. Initially, the switch 45 is set to the OFF state, allowing the video control signal on the cable 25 to be transferred to the sync signal detector 41. The sync signal detector 41 then checks the video control signal to thereby generate a status signal indicative of the appearance of the vertical sync component in the video control signal. This status signal is then transferred to the microprocessor 42, informing the microprocessor 42 that the address signal is to be imbedded into the video control signal at this time. By imbedding the address signal in a blank period in the vertical sync component of the video control signal, the imbedded address signal is prevented from interfering with the video control components in the video control signal. After the address signal is issued from the microprocessor 42, it is first transferred to the modulator 43 where the address signal is modulated into a suitable form for transmission over the cable 25 to the addressable video cameras 22. The modulated address signal is then amplified by the amplifier 44. At this time, the microprocessor 42 issues a control signal to the switch 45 so as to turn the switch 45 to conducting state, allowing the output of the amplifier 44 to be connected to the cable 25, subsequently transmitted over the cable 25 to all the addressable video cameras 22.

Figure 5A:
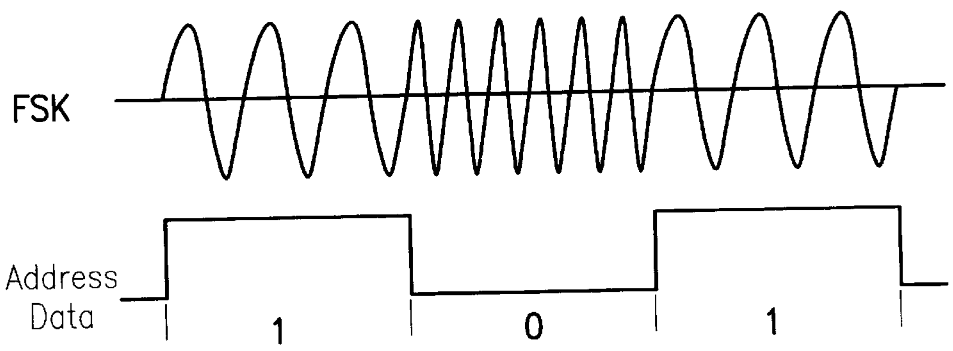
FIG. 5A is a waveform diagram showing the waveform of the modulated address signal when modulated by an FSK modulating method.
Figure 5B:
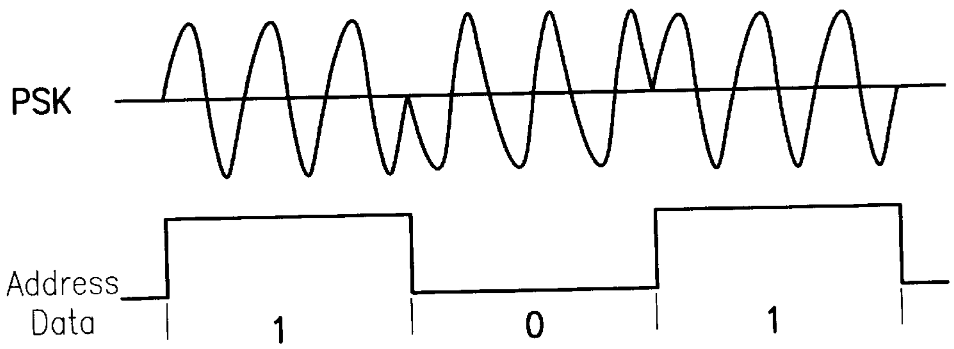
FIG. 5B is a waveform diagram showing the waveform of the modulated address signal when modulated by a PSK modulating method.
Figure 5C:
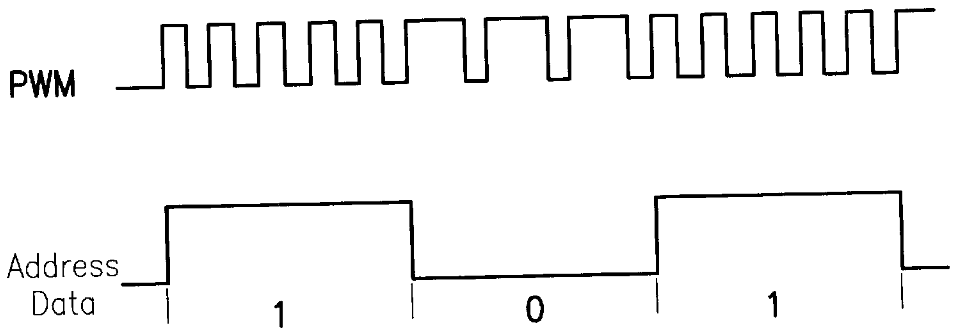
FIG. 5C is a waveform diagram showing the waveform of the modulated address signal when modulated by a PWM modulating method.

FIGS. 5A–5C show three examples of modulation methods that can be performed by the modulator 43 to modulate the address signal from the microprocessor 42 before it is embedded into the vertical sync component of the video signal.

FIG. 5A is a waveform diagram showing the waveform of the modulated address signal if the modulator 43 performs an FSK (frequency shift keying) modulating method. As shown, the FSK modulated address signal varies between two frequencies respectively corresponding to the binary values 0 and 1 in the address data. The FSK modulated address signal is then imbedded into the vertical sync component of the video signal. The FSK modulating method is a conventional and well-known modulating method in the field of communications, so details thereof will not be further described.

FIG. 5B is a waveform diagram showing the waveform of the modulated address signal if the modulator 43 performs a PSK (phase shift keying) modulating method. As shown, the PSK modulated address signal changes its phase by 180° each time the current bit in the sequential stream of the address data is changed in value, whether from 1 to 0 or from 1 to 0. The PSK modulated address signal is then imbedded into the vertical sync component of the video signal. The PSK modulating method is a conventional and well-known modulating method in the field of communications, so details thereof will not be further described.

FIG. 5C is a waveform diagram showing the waveform of the modulated address signal if the modulator 43 performs a PWM (pulse width modulation) modulating signal. As shown, the PWM modulated address signal varies between two pulse widths respectively corresponding to the binary values 0 and 1 in the address data. The PWM modulated address signal is then incorporated into the vertical sync component of the video signal. The PWM modulating method is a conventional and well-known modulating method in the field of communications, so details thereof will not be further described.

In conclusion, the security monitoring system of the invention is characterized by the provision of an capability to be addressed that allows a plurality of addressable video cameras to be connected via a single cable to the central control unit and the monitor. Each of the addressable video cameras is switched into active operation to send out the video signal back to the central control unit only when the received address data matches its preset address value. Since the signal transmission between the central control unit and the plurality of video cameras can be carried out over one single cable, the arrangement and handling of the security monitoring system is considerably simplified.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A security monitoring system with addressable capability, which comprises:

a cable having a first end and a second end;

a central control unit connected at the first end of the cable, capable of issuing a first signal;

at least one two addressable video cameras connected at the second end of the cable connected to the central control unit, the addressable video cameras receiving the first signal from the central control unit and comparing the first signal with a preset value, wherein if a match is achieved, the addressable video camera sends out a video signal via the cable back to the central control unit; and a monitoring device for displaying the video signal in visual form.

2. The security monitoring system of claim 1, wherein the first signal is an address signal.

3. The security monitoring system of claim 1, wherein the video signal represents a captured video image from the addressable video camera.

4. The security monitoring system of claim 3, wherein the video signal includes a horizontal sync component and a vertical sync component.

5. The security monitoring system of claim 4, wherein the first signal is imbedded in the vertical sync component of the video signal.

6. A security monitoring system with addressable capability, which comprises:

a cable having a first end and a second end;

a central control unit connected at the first end of the cable, capable of issuing a first signal;

at least one addressable video camera connected at the second end of the cable connected to the central control unit, the addressable video cameras receiving the first signal from the central control unit and comparing the first signal with a preset value, wherein if a match is achieved, the addressable video camera sends out a video signal via the cable back to the central control unit;

a monitoring device for displaying the video signal in visual form;

a sync signal detector, connected to the cable, for generating a status signal in response to the received second signal;

a microprocessor coupled to the sync signal detector, the microprocessor generating an address signal and a control signal in response to the status signal;

a modulator, coupled to the microprocessor, for modulating the address signal;

an amplifier, coupled to the modulator, for amplifying the modulated address signal, the output of the amplifier serving as the first signal; and a switch connecting the amplifier and the first end of the cable, the switch being turned to the connected state under control by the control signal from the microprocessor.

7. The security monitoring system of claim 6, wherein the status signal from the sync signal detector indicates a blank period in the vertical sync component of the second signal where the modulated address signal is to be imbedded.

8. The security monitoring system of claim 6, wherein the modulator performs a FSK modulating method to modulate the address signal.

9. The security monitoring system of claim 6, wherein the modulator performs a PSK modulating method to modulate the address signal.

10. The security monitoring system of claim 6, wherein the modulator performs a PWM modulating method to modulate the address signal.

11. The security monitoring system of claim 6, wherein the first signal is an address signal.

12. The security monitoring system of claim 6, wherein the video signal represents a captured video image from the addressable video camera.

13. The security monitoring system of claim 6, wherein the video signal includes a horizontal sync component and a vertical sync component.

14. The security monitoring system of claim 6, wherein the first signal is imbedded in the vertical sync component of the video signal.

* * * * *